(12) United States Patent
Bibolotti

(10) Patent No.: US 10,539,206 B2
(45) Date of Patent: Jan. 21, 2020

(54) ROTATIONAL SPEED REDUCER

(71) Applicants:Fondazione Istituto Italiano Di Tecnologia, Genoa (IT); Inail-Istituto Nazionale Assicurazione Contro GLI Infortuni Sul Lavoro, Rome (IT)

(72) Inventor: Alberto Bibolotti, Pietrasanta (IT)

(73) Assignees: FONDAZIONE ISTITUTO ITALIANO DI TECNOLOGIA, Genoa (IT); INAIL-ISTITUTO NAZIONALE ASSICURAZIONE CONTRO GLI INFORTUNI SUL LAVORO, Rome (IT)

( * ) Notice: Subject to any disclaimer, the term of this patent is extended or adjusted under 35 U.S.C. 154(b) by 121 days.

(21) Appl. No.: 15/740,266

(22) PCT Filed: Jul. 8, 2016

(86) PCT No.: PCT/IB2016/054114
§ 371 (c)(1),
(2) Date: Dec. 27, 2017

(87) PCT Pub. No.: WO2017/009759
PCT Pub. Date: Jan. 19, 2017

(65) Prior Publication Data
US 2018/0187754 A1    Jul. 5, 2018

(30) Foreign Application Priority Data
Jul. 13, 2015    (IT) .............................. UB2015A2131

(51) Int. Cl.
*F16H 1/46*    (2006.01)
*F16H 9/26*    (2006.01)
(Continued)

(52) U.S. Cl.
CPC ............... *F16H 1/46* (2013.01); *F02B 67/06* (2013.01); *F16G 1/28* (2013.01); *F16H 7/02* (2013.01);
(Continued)

(58) Field of Classification Search
CPC ... F16H 1/46; F16H 7/02; F16H 7/023; F16H 9/26; F16H 57/082; F16H 2001/2881;
(Continued)

(56) References Cited

U.S. PATENT DOCUMENTS 2,956,451 A    10/1960    Bowman
3,979,971 A *  9/1976    Generke ............. F16H 37/0826
                                                             475/7

(Continued)

FOREIGN PATENT DOCUMENTS

CA    1098341 A    3/1981
CA    1154982 A    10/1983
(Continued)

OTHER PUBLICATIONS

International Search Report for PCT/IB2016/054114 dated Oct. 20, 2016.
(Continued)

*Primary Examiner* — Leslie A Nicholson, III
(74) *Attorney, Agent, or Firm* — Hedman & Costigan, P.C.; James V. Costigan; Kathleen A. Costigan

(57) ABSTRACT

The present invention relates to an epicyclic speed reducer (1), comprising a casing (4) comprising a first (2a) and a second opening (2b) arranged on opposite faces of said casing (4). The casing (4) houses inside it: a first sun gear (20) fastened inside the casing (4) at said first opening (2a); a second sun gear (30) coaxial with the first sun gear (20) with the axis passing from the first opening (2a) to the second opening (2b); a first planet gear (8a, 8b) adapted to
(Continued)

describe a circular orbit around the first sun gear (20); a second planet gear (9a, 9b) adapted to describe a circular orbit around the second sun gear (30); a supporting element (5) interposed between the first (20) and second (30) sun gear and adapted to rotate around the axis, the supporting element (5) connected to the first (8a, 8b) and second (9a, 9b) planet gear in such a way as to allow a relative rotation of the supporting element (5) with respect to the first (8a, 8b) and second (9a, 9b) planet gear; a first belt (10) connected to the first planet gear (8a, 8b) and to the first sun gear (20); a second belt (11) connected to the second planet gear (9a, 9b) and to the second sun gear (30). Moreover the supporting element (5) is provided with a seat (21) coaxial with the axis and adapted to be fitted on one end (2) of a driving shaft such that when the seat is fitted on the driving shaft the supporting element (5) and the driving shaft are rigidly connected.

7 Claims, 6 Drawing Sheets

(51) Int. Cl.
| | |
|---|---|
| *F16H 7/02* | (2006.01) |
| *F02B 67/06* | (2006.01) |
| *F16G 1/28* | (2006.01) |
| *F16H 57/08* | (2006.01) |
| *F16H 1/28* | (2006.01) |
| *F16H 7/08* | (2006.01) |

(52) U.S. Cl.
CPC ............... *F16H 7/023* (2013.01); *F16H 9/26* (2013.01); *F16H 57/082* (2013.01); *F05B 2260/40311* (2013.01); *F16H 2001/2881* (2013.01); *F16H 2007/0865* (2013.01)

(58) Field of Classification Search
CPC .... F16H 2007/0865; F02B 67/06; F16G 1/28; F05B 2260/40311
USPC .......................................................... 475/182
See application file for complete search history.

(56) References Cited

U.S. PATENT DOCUMENTS

| | | | | |
|---|---|---|---|---|
| 4,321,842 | A | | 3/1982 | Stromotich |
| 4,919,011 | A | | 4/1990 | Kemp, Jr. |
| 5,269,734 | A | * | 12/1993 | Menge, Sr. ............... F16H 7/06 475/182 |
| 5,391,125 | A | * | 2/1995 | Turra .................... F16H 1/2836 475/331 |
| 7,086,979 | B2 | * | 8/2006 | Frenken .................... F16H 1/28 475/182 |
| 7,182,709 | B2 | * | 2/2007 | Christ ....................... F16H 1/28 475/331 |
| 9,428,972 | B2 | * | 8/2016 | Rosano ................. E21B 19/164 |
| 2003/0054912 | A1 | | 3/2003 | Nohara |
| 2005/0085324 | A1 | | 4/2005 | Christ |
| 2014/0243139 | A1 | * | 8/2014 | Weiss ..................... F16H 55/36 475/210 |

FOREIGN PATENT DOCUMENTS

| | | |
|---|---|---|
| EP | 1296084 A2 | 3/2003 |
| WO | 03/050434 A1 | 6/2003 |

OTHER PUBLICATIONS

PCT Written Opinion of the International Searching Authority dated Oct. 20, 2016.

* cited by examiner

ROTATIONAL SPEED REDUCER

TECHNICAL FIELD

The present invention relates to the field of motion transmitting mechanisms, particularly of the type used for reducing angular velocity.

The present invention particularly relates to epicyclic speed reducers according to the preamble of claim 1.

PRIOR ART

The epicyclic speed reducer is a mechanism able to transmit a rotational motion from a driving shaft to a driven shaft while reducing rotational angular velocity.

Generally the speed reducer comprises a sun gear and one or more planet gears rotating about it. Planet gears generally are mounted on a structure, called as arm or planet carrier, free to rotate at a speed different from that of the sun gear or of the driving shaft.

Epicyclic gear trains are currently known having different configurations that allow the motion of the driving shaft to be transferred, while being reduced, to the driven shaft.

For example U.S. Pat. Nos. 2,956,451 and 4,919,011 disclose an epicylic transmitting system. The first one discloses a speed reducer based on a kinematic chain of gears, while the second one discloses a planet carrier structure comprising an external guide surface, an inner concentric guide surface and a plurality of planet gears composed of ball bearings in frictional contact with both the guide surfaces.

The solution known from U.S. Pat. No. 2,956,451 has the drawback that the use only of gears makes the speed reducer subject to failures due to impulse torques, for example resulting from impacts, which act on the driven shaft therefore causing the speed reducer to be worn to a greater extent. Moreover such solution does not allow mechanical power to be transferred in a fluid and progressive manner and its operation generates a high noise due to metal couplings transmitting the motion.

The solution known from U.S. Pat. No. 4,919,011 on the contrary has the drawback that the contacts between gears are guaranteed only by the friction between two metal surfaces, and this leads to high overheating and it reduces both the life cycle of the speed reducer and the torque that can be transmitted.

A solution reducing the drawbacks of speed reducers known in U.S. Pat. Nos. 2,956,451 and 4,919,011 is described in the U.S. Pat. No. 4,321,842. It discloses an epicylic speed reducer with a sun gear transmitting the motion through belts to the planet gears and therefore to the motion output sun gear. In particular motion is transmitted through a rod to a first and second pulleys connected by a belt to two planet gears placed inside a planet carrier. The rotation of the carrier results from the rotation of one of the planet gears and it rotates the output sun gear with which it is integral.

Such arrangement however determines great overall dimensions both in the radial direction and in the axial direction of the speed reducer, and it invalidates the efficiency of the system due to mechanical losses resulting from the high number of components of the kinematic chain. Moreover such a complicated system is subjected to higher frictions, it runs the risk of being unbalanced and of generating vibrations that allow it to be used only under moderate speeds.

OBJECTS AND SUMMARY OF THE INVENTION

It is an object of the present invention to overcome prior art drawbacks.

In particular it is an object of the present invention to provide a compact epicyclic speed reducer.

It is also an object of the present invention to provide an epicyclic speed reducer with high efficiency and noiselessness properties.

These and other objects of the present invention are achieved by an epicyclic speed reducer embodying the characteristics of the annexed claims, which are an integral part of the present description.

The idea at the base of the present invention is to provide an epicyclic speed reducer comprising a casing, comprising a first and a second openings arranged on two opposite faces thereof, and the casing housing inside it:
  a first sun gear, fastened inside the casing at the first opening,
  a second sun gear coaxial with the first sun gear and having the axis passing from the first opening to the second opening,
  a first planet gear adapted to describe a circular orbit around the first sun gear,
  a second planet gear adapted to describe a circular orbit around the second sun gear,
  a supporting element interposed between the first and the second sun gear, adapted to rotate around said axis and connected to the first and second planet gear in such a way as to allow a relative rotation thereof with respect to the first and second planet gear,
  a first belt connected to the first planet gear and to the first sun gear,
  a second belt connected to the second planet gear and to the second sun gear.

The supporting element is further provided with a seat coaxial with the axis, intended to be engaged on one end of a driving shaft such that when the seat is engaged on the driving shaft the supporting element and the driving shaft are rigidly connected.

Such solution allows overall dimensions of an epicyclic speed reducer to be reduced while obtaining a compact speed reducer miniaturizable both in the radial and axial directions, due to the reduced number of components used and to their arrangement coaxial with the axis of the rotational motion passing through the speed reducer.

Moreover the greater simplicity in transmitting the motion allows a speed reducer more efficient and rotationally balanced to be obtained. Such better balancing and the reduced number of components causes vibrations during its operation to be reduced, and therefore it allows the value of the allowable maximum speed of the driving shaft to be increased.

Moreover the use of belts further improves the efficiency of the speed reducer since it allows power to be transmitted more fluidly, progressively and with a low noise, while allowing impacts and sudden changes of the load to be absorbed, protecting motors and supports connected thereto.

Further advantageous characteristics of the present invention will be more clear from the following description and from the annexed claims, which are an integral part of the present description.

BRIEF DESCRIPTION OF THE DRAWINGS

The present invention will be described below with reference to non-limitative examples provided by way of example and not as a limitation in the annexed drawings. These drawings show different aspects and embodiments of the present invention and, where appropriate, reference numerals showing like structures, components, materials and/or elements in different figures are denoted by like reference numerals.

DETAILED DESCRIPTION OF THE INVENTION

While the invention is susceptible of various modifications and alternative forms, some non-limitative embodiments, given by way of example, are described herein below in details.

It should be understood, however, that there is no intention to limit the invention to the specific embodiments disclosed, but, on the contrary, the intention of the invention is to cover all modifications, alternative constructions and equivalents falling within the scope of the invention as defined in the claims.

Therefore, in the description below, the use of "for example", "etc", "or" indicates non-exclusive alternatives without limitation unless otherwise defined; the use of "also" means "among which, but not limited to", unless otherwise defined; the use of "include/comprise" means "include/comprise, but not limited to," unless otherwise defined.

Figure 1:
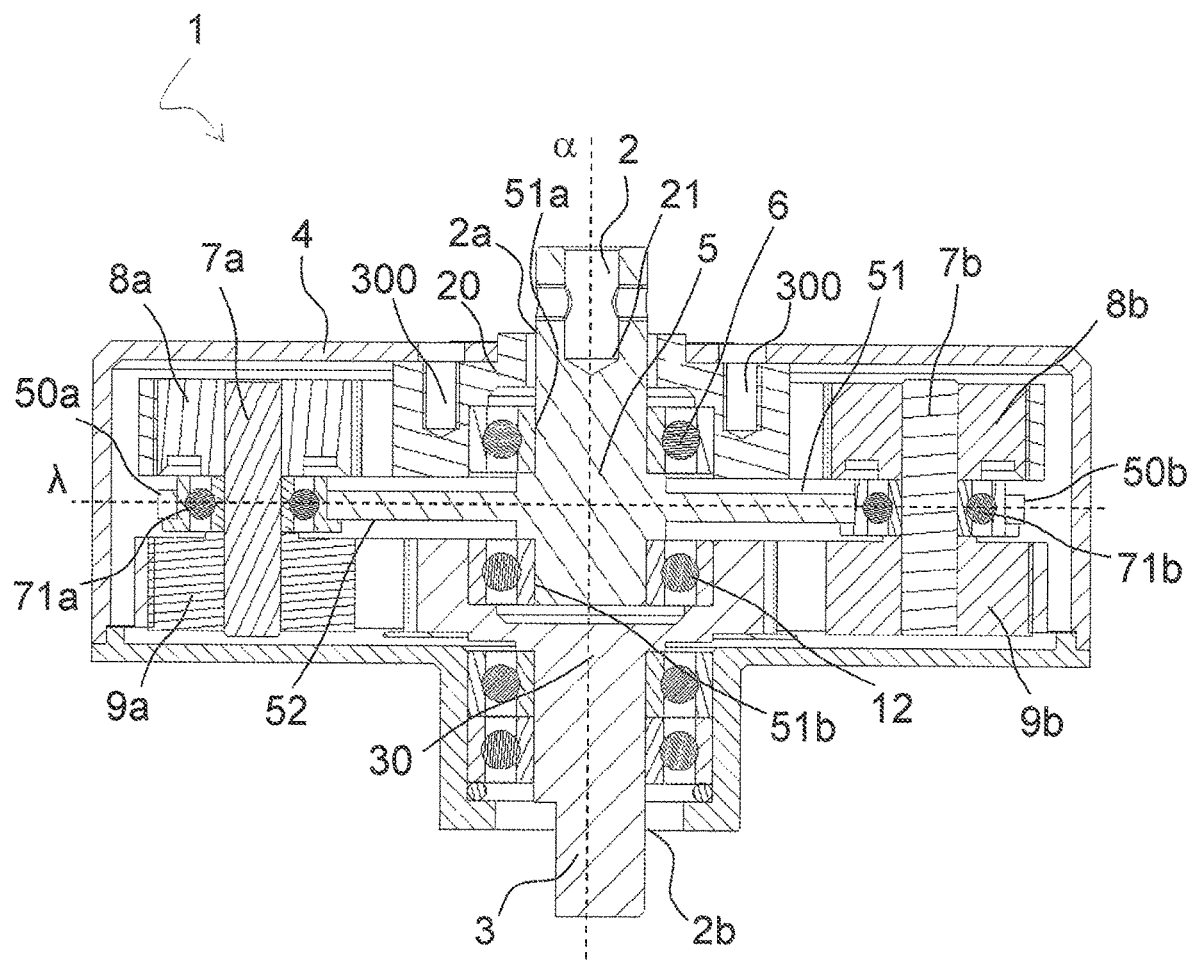
FIG. 1 is a section of a top view of the speed reducer according to the invention.

FIG. 1 is a section of a top view of an epicyclic speed reducer, denoted by reference numeral 1, to transmit a rotational motion from one input shaft—typically a driving shaft—to an output shaft that is the driven shaft. The speed reducer 1 allows the angular velocity of the driving shaft to be transferred, providing to the driven shaft a rotational motion with a reduced angular velocity.

In the embodiment shown in FIG. 1 the speed reducer 1 comprises a casing 4 provided with two openings (2a, 2b) arranged on two opposite faces thereof. A first opening 2a allows the rotational motion to be introduced inside the casing 4 and a second opening 2b allows it to go outside it.

The driving shaft and the driven shaft (not shown in the figure) are coaxial, that is they rotate about the same axis of rotation α and are inserted in the speed reducer 1 each one by a corresponding end (2, 3), at the first opening (2a) by the end 2 of the driving shaft and at the second opening (2b) by the end 3 of the driven shaft.

Particularly the end 2 of the driving shaft is fitted into a seat 21, obtained in a supporting element 5 with a substantially plate-like geometry, and placed coaxial with the axis of rotation α. Such element, called as "planet carrier", supports gears, called as "planet gears", that rotate while describing a circular orbit around gears—called as "sun gears"—and that will be described below more in details.

The rotational motion of the driving shaft entering the casing 4 of the speed reducer 1 is therefore transferred directly to the planet carrier 5 thus resulting in that a rotation of the driving shaft corresponds to the same rotation of the planet carrier 5.

At the first opening 2a and inside the casing 4 there is provided a first gears 20—called below as "first sun gear"— coaxial with the driving shaft and fastened to the casing 4 through tightening pins 300. Between the first sun gear 20 and the driving shaft a rolling-element bearing 6 is interposed, which is inserted so as to abut on shoulders 51a provided on the planet carrier 5, to allow loads exerted on the driving shaft to be withstood, while further releasing the rotation thereof with respect to the first sun gear 20.

As mentioned above, inside the casing 4 the planet carrier 5 is housed that comprises two surfaces, an inner one 51 facing the motion input opening 2a and an outer one 52 on the contrary facing the motion output opening 2b.

The planet carrier 5 develops along a direction λ orthogonal to the axis of rotation α, and it has two ends (50a,50b) placed symmetrically with respect to the latter.

At each one of the two ends there is provided a through hole, a pin (7a,7b) passing therethrough. On each one of the pins a pair of gears—or "planet" gears—is rigidly constrained, a first pair (8a,9a) for the pin (7a) and a second pair (8b,9b) for the pin (7b) respectively. The pins are parallel with each other and with the axis of rotation α and their coupling with the planet carrier 5 is obtained by rotational joints (71a, 71b) for example bearings or bushings: this type of coupling enables the relative rotation of the planet gears (8a,8b,9a,9b) with respect to the rotation of the planet carrier 5 exerted by the driving shaft.

Figure 2:
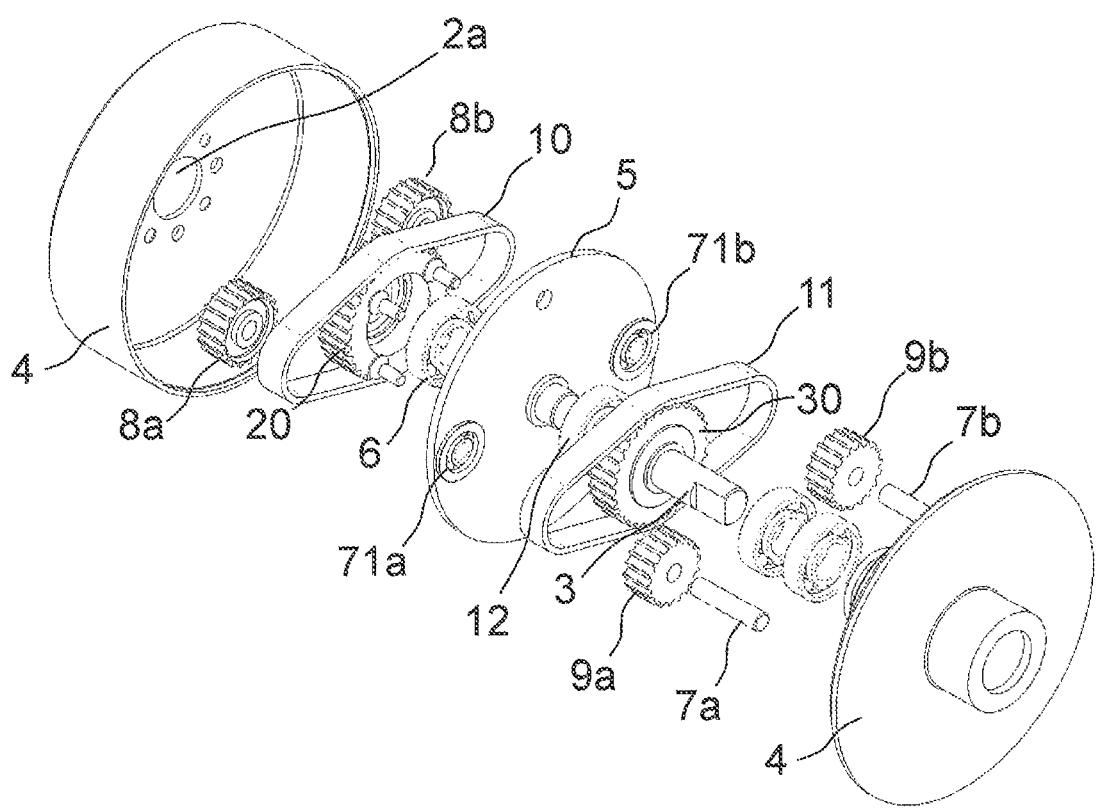
FIG. 2 is an exploded view of the speed reducer according to the invention.

In particular first planet gears (8a,8b) are fitted on the portions of the pins (7a,7b) respectively that protrude from the inner surface 51 of the planet carrier 5 and are kinematically connected with each other through a first toothed belt 10 (see FIG. 2). The belt 10 is a continuous band and it forms a loop and preferably it is made of elastomeric material. It is further arranged with an orientation parallel to the direction λ and it further engages the first sun gear 20, that is placed between the two first planet gears (8a, 8b).

Such arrangement enables a compound rotational motion of the first planet gears (8a,8b), obtained as the combination of a motion given by their circular trajectory about the first sun gear 20 and by their own relative rotational motion with respect to the planet carrier 5 supporting them.

Since the pins (7a, 7b) rigidly restrain the rotation of the first planet gears (8a, 8b) and of respective second planet gears (9a, 9b) the kinematics composed of the first sun gear 20, the first planet gears (8a,8b) and of the first toothed belt 10 allows the same relative rotation of the first planet gears (8a,8b) to be transferred to the second planet gears (9a,9b) through the pins (7a,7b).

The second planet gears (9a, 9b) are fitted on the portions of the pins (7a,7b) respectively protruding from the outer surface 52 of the planet carrier 5. Preferably the first (8a,8b) and second (9a,9b) planet gears have a different diameter and/or number of teeth, and such constructional parameters can vary for example depending on the gear ratio desired to be obtained by the speed reducer 1.

Likewise the first planet gears, also the second planet gears (9a,9b) are kinematically constrained to a second sun gear 30 by a second toothed belt 11, placed parallel to the first belt 10 and which can be seen in FIG. 2.

In details, the planet carrier 5 is interposed between the first 20 and second 30 sun gear the latter being rigidly fitted on the driven shaft and coaxial with the axis of rotation α.

A second rolling-element bearing 12, inserted so as to abut on further shoulders 51b protruding from the outer surface 52 of the planet carrier 5, allows a relative rotation of the second sun gear 30 with respect to the rotation of the planet carrier 5.

Also the second planet gears (9a, 9b) are therefore characterized by a compound rotational motion: they rotate at the same angular velocity of the first planet gears (8a,8b) and contemporaneously they describe a circular trajectory around the second sun gear 30 which is rotated through the second toothed belt 11.

The second sun gear 30 is rigidly constrained to the end 3 of the driven shaft, and theretofore it receives a rotational motion that is the output rotation motion from the speed reducer 1.

From the description above it is clear how the speed reducer described allows the above objects to be achieved.

Therefore it is clear for a person skilled in the art that it is possible to make changes and variants to the solution described with reference to the above figures without for this reason departing from the scope of protection of the present patent as defined by the annexed claims.

Figure 3:
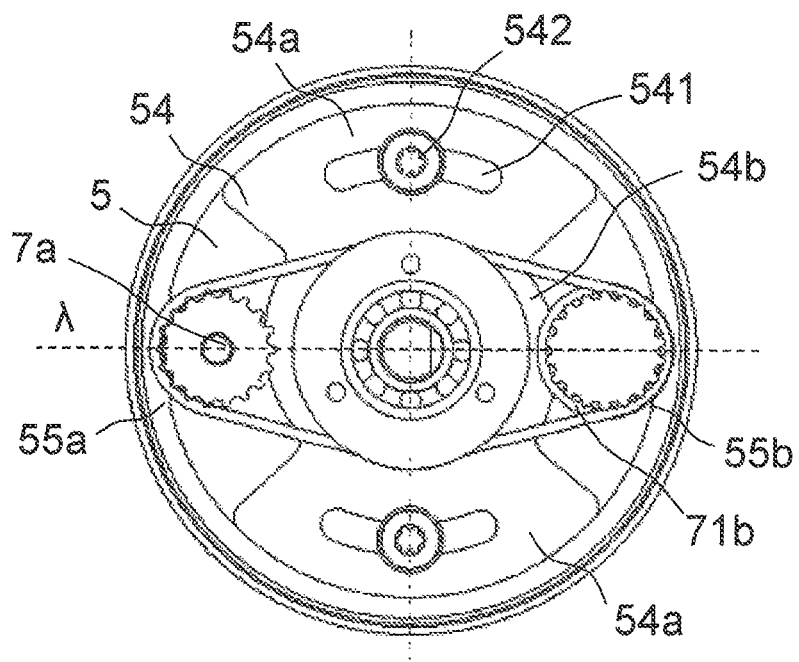
FIGS. 3 and 4 are sections of a front view of two variant embodiments of the speed reducer according to the invention.

For example in order to regulate the tension of the first 10 and second belt 11 of the speed reducer 1, in one alternative embodiment of the invention, shown in FIG. 3, it is possible to provide a discoid element 54, with an eccentric cam profile, to be fastened on one of the inner surface 51 or outer surface 52 of the planet carrier 5 and coaxial with the rotation thereof.

The ends (50a, 50b) of the planet carrier, instead of being perforated, in this case provide recesses (55a,55b) that allow a radial mobility of the pins (7a, 7b) on which the first (8a,9a) and second (8b,9b) pair of planet gears are fitted respectively, by means of a suitable rotation of the discoid element 54.

The discoid element 54 comprises two areas (54a,54b) with different radial extensions: a first area 54a, that is external and with a greater radius, and a second area 54b that is internal and with a smaller radial profile provided with eccentricity.

In particular the first area 54a comprises slots 541 that receive a screw-tightening nut pair 542 to retain the discoid element 54 to the planet carrier 5 and allow it to rotate about the axis of rotation α. The profile of the second area 54b is maintained in forced contact with the flanks of the pins (7a, 7b) therefore allowing, after rotating the discoid element 54, the translation of the pins, and therefore of the pairs of planet gears meshing the belts, to be regulated along the direction λ.

Figure 4:
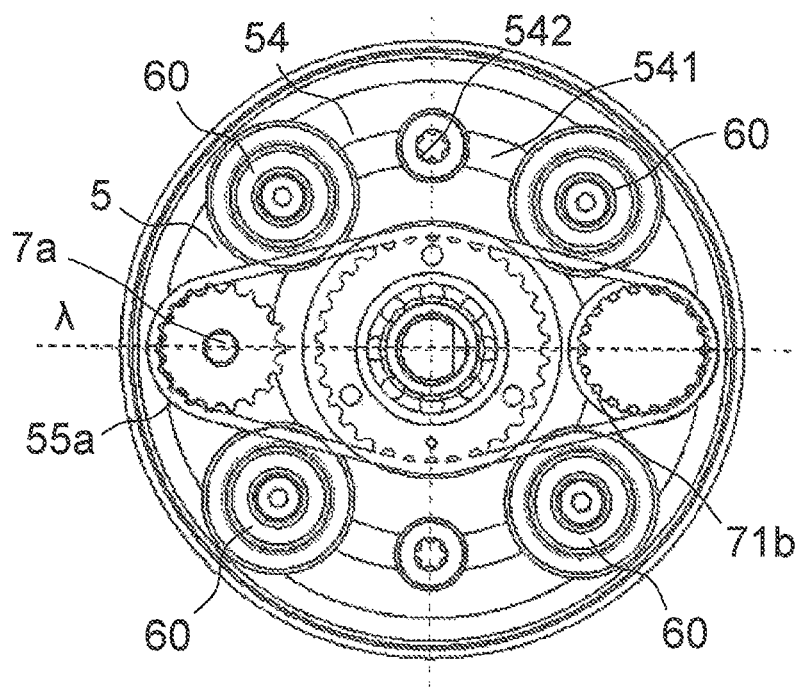

In a further constructional variant of the speed reducer 1 the tension of the belts is obtained by means of tensioning frictional wheels. Such variant is shown in FIG. 4 and it provides, in addition to the variant of FIG. 3 described above, the provision of two discoid elements 54, one being fastened to the inner surface 51 and one being fastened to the outer surface 52 of the planet carrier 5 (FIG. 4 shows only the one fastened to the outer surface).

On the slots 541 of each of the two discoid elements 54 four idle wheels 60, with smooth profile, are fastened, whose position can be regulated on the length of the slots, and each one pressing the branches of the belts (10, 11) not meshing with the first (8a,8b) and second (9a,9b) planet gears respectively.

In such arrangement the pins (7a, 7b) of the planet gears are maintained stationary with respect to the planet carrier 5.

Figure 5:
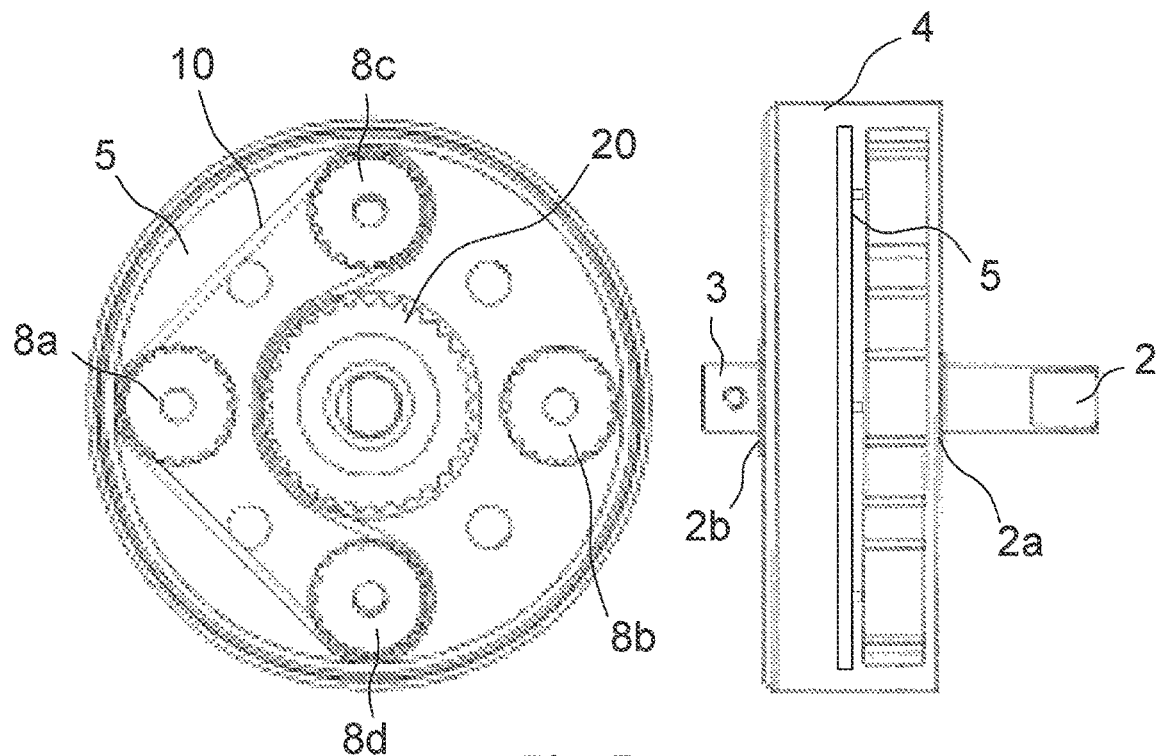
FIGS. 5 and 6 are sections of front and side views of a further variant embodiment of the speed reducer according to the invention.
Figure 6:
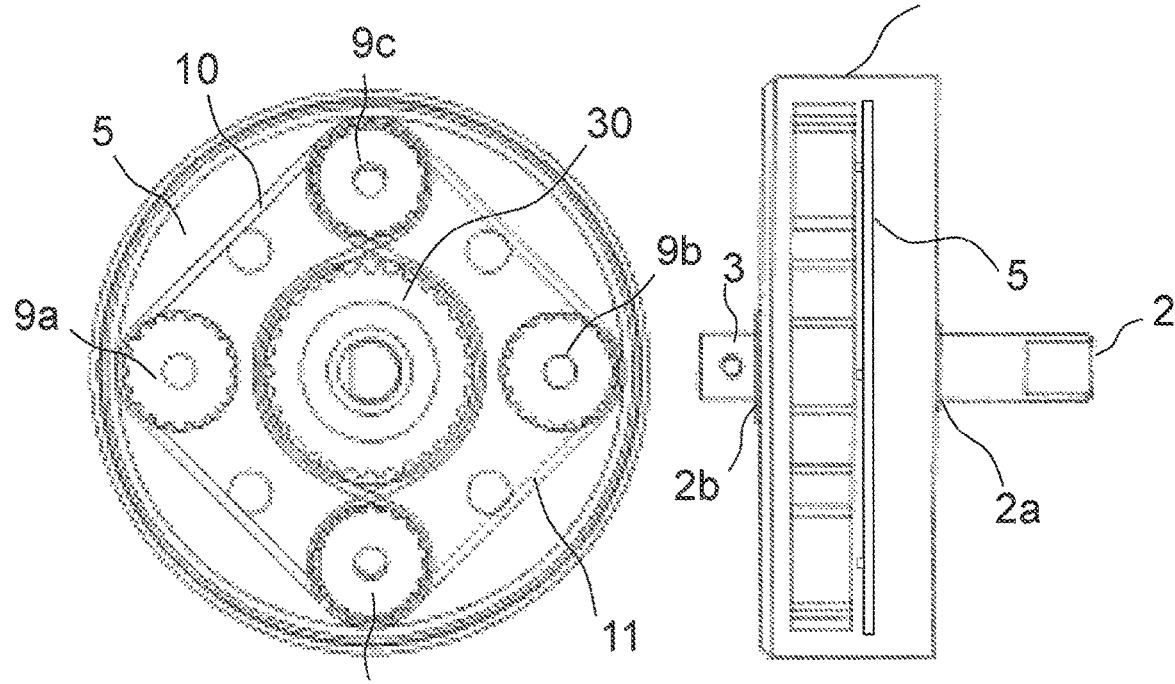
Figure 7:
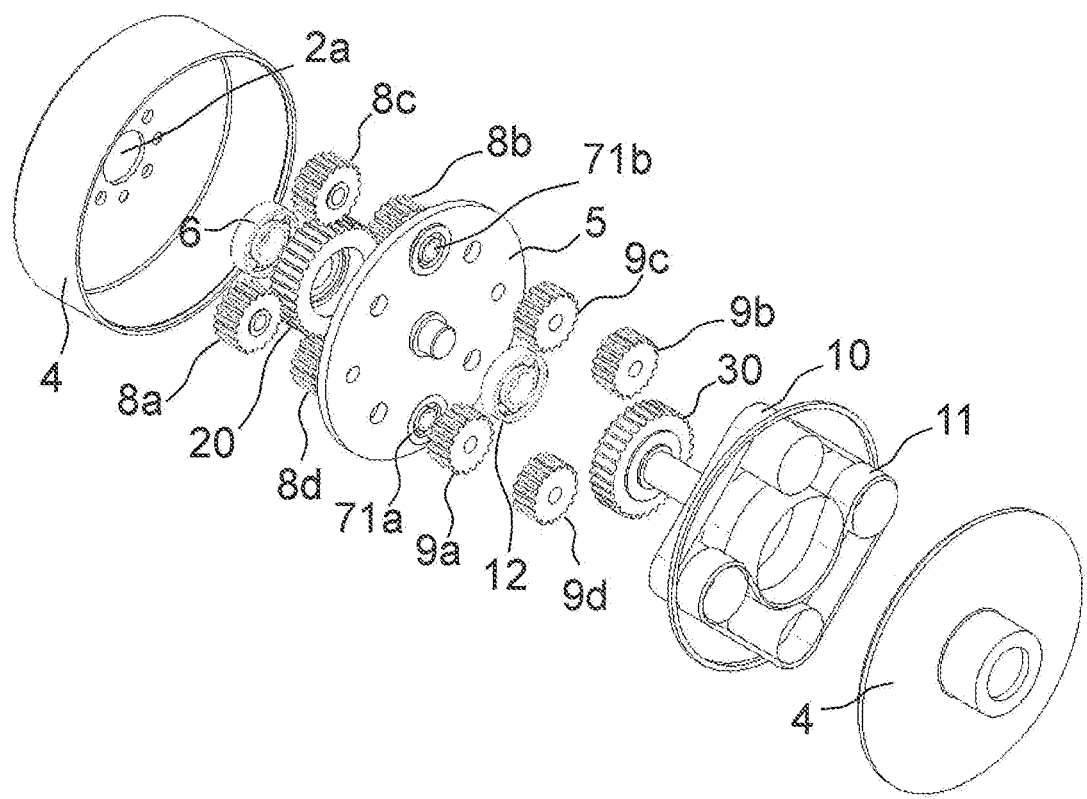
FIG. 7 is an exploded view of the speed reducer of FIGS. 5 and 6.
Figure 8:
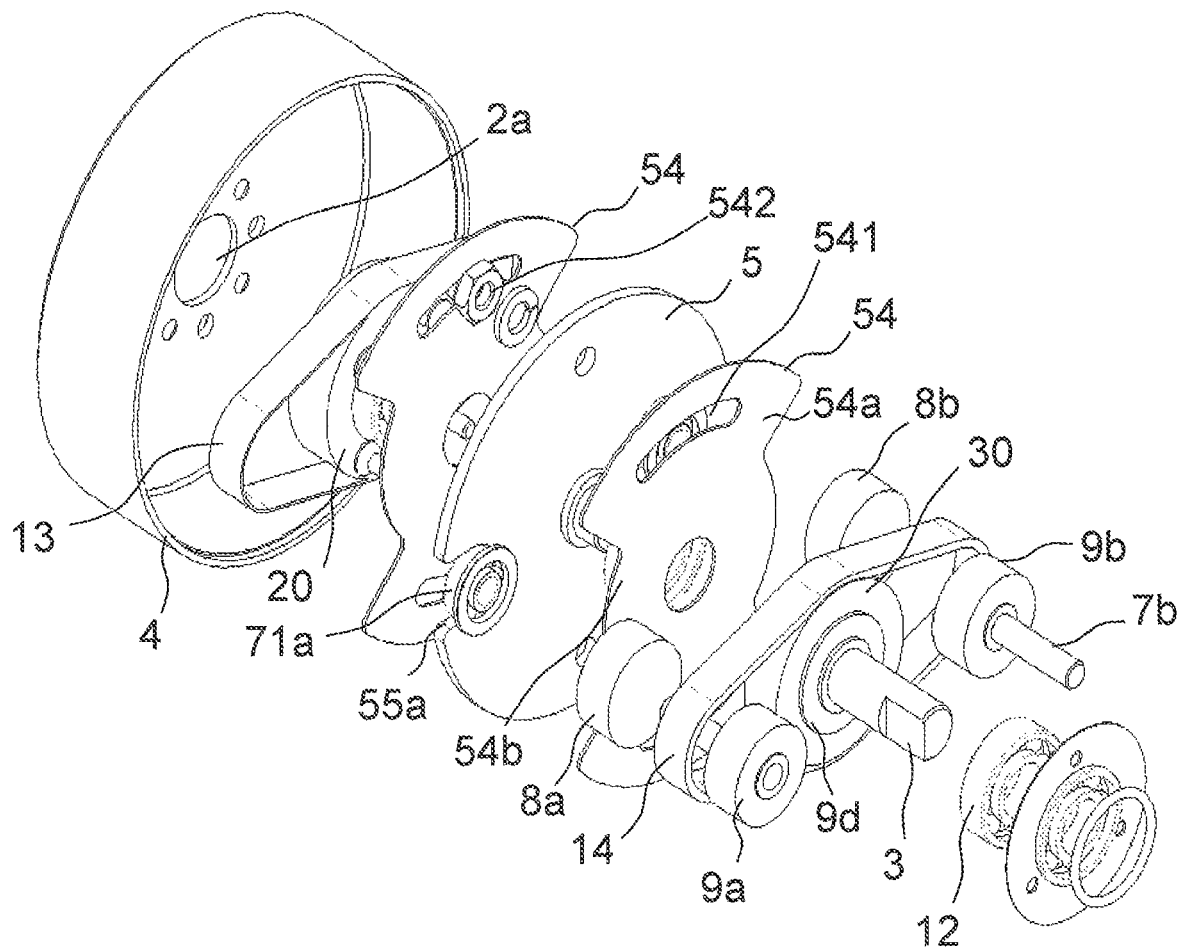
FIG. 8 is an exploded view of a further variant embodiment of the speed reducer according to the invention.

A further embodiment, shown in FIGS. 5, 6 and 7 provides to use a first group of four planet gears (8a,8b,8c, 8d) for the first sun gear 20, and a second group of additional four planet gears (9a,9b,9c,9d) for the second sun gear 30. For each one of the two groups, the four planet gears are arranged in an axial-symmetric manner on the respective inner faces 51—such as shown in FIG. 5—and outer face 52—such as shown in FIG. 6—of the planet carrier 5. In such variant, each one of the two belts (10, 11) can have teeth only on one face or on both the faces, and can mesh the respective sun gear and some or all the respective planet gears, following different paths depending for example on the values of the torque desired as output from the speed reducer 1.

The variant embodiment shown in FIG. 6 on the contrary provides the use of flat belts (13, 14) with a V-shape or trapezoidal shape, instead of the toothed belts. Accordingly all the gears used in such variant have a profile with no teeth. Likewise what described in FIG. 3 and FIG. 4 such arrangement provides discoid elements 54 applied to the planet carrier 5 to selectively regulate the tension of the first (8a, 8b) and second (9a,9b) planet gears, through a radial translation of the pins (7a, 7b) in the recesses (55a,55b) or, as an alternative, through the use of idle gears 60 that press the branches of the belts not meshing the planet gears and sun gear.

The invention claimed is:

1. Epicyclic speed reducer (1) comprising a casing (4) comprising a first (2a) and a second opening (2b) arranged on opposite faces of said casing (4), and wherein the casing (4) houses inside it:
    a first sun gear (20) fastened inside the casing (4) at said first opening (2a),
    a second sun gear (30) coaxial with the first sun gear (20) with the axis passing from said first opening (2a) to said second opening (2b),
    a first planet gear (8a, 8b) adapted to describe a circular orbit around said first sun gear (20),
    a second planet gear (9a, 9b) adapted to describe a circular orbit around said second sun gear (30),
    a supporting element (5) interposed between said first (20) and second (30) sun gear and adapted to rotate around said axis, said supporting element (5) connected to said first (8a, 8b) and second (9a, 9b) planet gear in such a way as to allow a relative rotation of the supporting element (5) with respect to said first (8a, 8b) and second (9a, 9b) planet gear,
    a first belt (10) connected to the first planet gear (8a, 8b) and to the first sun gear (20),
    a second belt (11) connected to the second planet gear (9a, 9b) and to the second sun gear (30),
characterized in that the supporting element (5) is provided with a seat (21) coaxial with said axis and adapted to be fitted on one end (2) of a driving shaft such that when the seat is fitted on the driving shaft the supporting element (5) and the driving shaft are rigidly connected, further comprising a discoid element (54) provided with a slot (541), wherein the discoid element (54) is applied to one surface of the supporting element (5) orthogonal to said axis by means of a screw-bolt coupling (542), wherein said screw-bolt coupling (542) is formed by a screw that passes through said slot and said supporting element, and a bolt engaged with the screw, in such a way that such screw-bolt coupling allows a relative rotation of the discoid element (54) relative to the supporting element (5) for a distance corresponding to the length of the slot.

2. Epicyclic speed reducer (1) according to claim 1, wherein the supporting element (5) has two ends (50a, 50b) arranged symmetrically to said axis and provided with at least one recess (55*a*, 55*b*) in which a pin (7*a*, 7*b*) is inserted, said pin being constrained to the supporting element (5) through a rotational joint (71*a*, 71*b*).

3. Epicyclic speed reducer (1) according to claim 1, wherein the pin (7*a*, 7*b*) passes through the supporting element and wherein the first (8*a*, 8*b*) and the second (9*a*, 9*b*) planet gear are rigidly constrained to two opposite ends of the pin (7*a*, 7*b*).

4. Epicyclic speed reducer (1) according to claim 1, wherein the discoid element (54) comprises an internal area (54*b*) provided with an eccentric profile, wherein said eccentric profile is maintained in forced contact with a flank of the pin (7*a*, 7*b*) in such that the rotation of the discoid element (54) corresponds to a radial translation of the pin (7*a*, 7*b*) on the supporting element (5).

5. Epicyclic speed reducer (1) according to claim 1, wherein on the slot (541) an idle gear (60) is fastened adapted to press a branch of one of the first and second belt (10,11) interposed between a first gripping point of said belt with the respective planet gear and a second gripping point of the belt with the respective sun gear.

6. Epicyclic speed reducer (1) according to claim 1, wherein the two belts (10, 11) have a flat or "V" or trapezoidal profile.

7. Epicyclic speed reducer (1) comprising a casing (4) comprising a first (2*a*) and a second opening (2*b*) arranged on opposite faces of said casing (4), and wherein the casing (4) houses inside it:
   a first sun gear (20) fastened inside the casing (4) at said first opening (2*a*),
   a second sun gear (30) coaxial with the first sun gear (20) with the axis passing from said first opening (2*a*) to said second opening (2*b*),
   a first planet gear (8*a*, 8*b*) adapted to describe a circular orbit around said first sun gear (20),
   a second planet gear (9*a*, 9*b*) adapted to describe a circular orbit around said second sun gear (30),
   a supporting element (5) interposed between said first (20) and second (30) sun gear and adapted to rotate around said axis, said supporting element (5) connected to said first (8*a*, 8*b*) and second (9*a*, 9*b*) planet gear in such a way as to allow a relative rotation of the supporting element (5) with respect to said first (8*a*, 8*b*) and second (9*a*, 9*b*) planet gear,
   a first belt (10) connected to the first planet gear (8*a*, 8*b*) and to the first sun gear (20),
   a second belt (11) connected to the second planet gear (9*a*, 9*b*) and to the second sun gear (30), characterized in that the supporting element (5) is provided with a seat (21) coaxial with said axis and adapted to be fitted on one end (2) of a driving shaft such that when the seat is fitted on the driving shaft the supporting element (5) and the driving shaft are rigidly
connected, wherein the supporting element (5) supports two groups of four planet gears (8*a*, 8*b*, 8*c*, 8*d*, 9*a*, 9*b*, 9*c*, 9*d*), wherein the first belt (10) meshes the first sun gear (20) and at least one planet gear of a first group (8*a*, 8*b*, 8*c*, 8*d*) of said two groups, and wherein the second belt (11) meshes the second sun gear (30) and at least one planet gear of a second group (9*a*, 9*b*, 9*c*, 9*d*) of said two groups, wherein the belts (10, 11) have a toothed profile on both faces and each one meshes one or more planet gears of a respective group.

* * * * *